US011396332B2

(12) United States Patent
Matsuoka

(10) Patent No.: US 11,396,332 B2
(45) Date of Patent: Jul. 26, 2022

(54) FRONT BODY STRUCTURE OF VEHICLE

(71) Applicant: MAZDA MOTOR CORPORATION, Hiroshima (JP)

(72) Inventor: Hiroki Matsuoka, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 478 days.

(21) Appl. No.: 16/540,410

(22) Filed: Aug. 14, 2019

(65) Prior Publication Data

US 2020/0062314 A1 Feb. 27, 2020

(30) Foreign Application Priority Data

Aug. 22, 2018 (JP) .............................. JP2018-155732

(51) Int. Cl.
*B62D 25/08* (2006.01)
*B62D 29/00* (2006.01)

(52) U.S. Cl.
CPC ......... *B62D 25/088* (2013.01); *B62D 29/007* (2013.01); *B60G 2204/15* (2013.01); *B60G 2206/60* (2013.01)

(58) Field of Classification Search
CPC .... B62D 25/08; B62D 25/088; B62D 29/007; B60G 2204/15; B60G 2204/10; B60G 2206/60; B60G 2206/01
See application file for complete search history.

(56) References Cited

U.S. PATENT DOCUMENTS

2004/0011513 A1 1/2004 Haneda et al.
2005/0236827 A1 10/2005 Mouch et al.
2017/0043810 A1 2/2017 Kim
2017/0174264 A1* 6/2017 Maruyama ............. B62D 25/16
2017/0174265 A1 6/2017 Maruyama et al.
(Continued)

FOREIGN PATENT DOCUMENTS

CN 101195392 A * 6/2008 .......... B62D 21/152
DE 10 2016 015016 A1 6/2017
(Continued)

OTHER PUBLICATIONS

The extended European search report issued by the European Patent Office dated Jan. 16, 2020, which corresponds to European Patent Application No. 119191363.1-1009 and is related to U.S. Appl. No. 16/540,410.

(Continued)

*Primary Examiner* — Lori L Lyjak
(74) *Attorney, Agent, or Firm* — Studebaker & Brackett PC

(57) ABSTRACT

A front body structure of a vehicle includes a pair of left and right hinge pillars, a pair of left and right front suspension dampers that are provided in desired positions on an inner side in a vehicle width direction of the hinge pillars and on a vehicle front side of the hinge pillars, a pair of left and right suspension housings that have damper mount parts, and a pair of left and right apron reinforcements to which upper ends of the suspension housings are joined. The apron reinforcements are formed in shapes extending substantially linearly from the rear ends thereof toward the vehicle front side and an inner side in the vehicle width direction through an outer side in the vehicle width direction of the damper mount parts in plan view.

4 Claims, 11 Drawing Sheets

(56) References Cited

U.S. PATENT DOCUMENTS

| | | | | |
|---|---|---|---|---|
| 2017/0203793 A1* | 7/2017 | Nakamura | ............ | B62D 25/088 |
| 2017/0203794 A1* | 7/2017 | Nakamura | ............. | B62D 25/04 |
| 2018/0029649 A1 | 2/2018 | Maruyama | | |

FOREIGN PATENT DOCUMENTS

| | | |
|---|---|---|
| DE | 10 2017 006 901 A1 | 2/2018 |
| EP | 2 314 500 A2 | 4/2011 |
| EP | 2 360 081 A1 | 8/2011 |
| JP | 2002-166849 A | 6/2002 |
| JP | 2017-114148 A | 6/2017 |
| JP | 2018-016178 A | 2/2018 |
| WO | WO-2017126317 A1 * 7/2017 ........... B62D 21/152 |  |

OTHER PUBLICATIONS

An Office Action; "Notice of Reasons for Refusal", mailed by the Japanese Patent Office dated Sep. 28, 2021, which corresponds to Japanese Patent Application No. 2018-155732 and is related to U.S. Appl. No. 16/540,410; with English language translation.

* cited by examiner

FRONT BODY STRUCTURE OF VEHICLE

BACKGROUND

Technical Field

The present disclosure relates to a front body structure of a vehicle in which, for example, aluminum die-cast suspension housings that support front suspension dampers of the vehicle are connected to apron reinforcements made of steel.

Background Art

In vehicles such as automobiles, aluminum die-cast suspension housings are known as members for supporting front suspension dampers that suppress vertical motion of vehicles by expanding and contracting according to, for example, the unevenness of a road surface to ensure the ride comfort for occupants as described, for example, in JP-A-2017-114148.

Such aluminum die-cast suspension housings can easily obtain the rigidity against input loads from front suspension dampers as compared with suspension housings by, for example, press-forming because of its higher formation flexibility. However, if the rigidity of suspension housings is high, when input loads from front suspension dampers act on suspension housings, there is a possibility that the joint portions between the suspension housings and the body become stresses concentration portions.

In particular, when aluminum die-cast suspension housings and apron reinforcements made of steel are connected and jointed to each other as described in JP-A-2017-114148, the joint portions are likely to become stresses concentration portions. Accordingly, the rigidity of the joint portions between the apron reinforcements and the suspension housings are desirably improved.

However, since the front fenders that cover the outer side in the vehicle width direction and the vehicle upper side and the suspension arms that swing in the vehicle up-down direction are provided around the joint portions between the apron reinforcements and the suspension housings, if reinforcing parts for reinforcing the joint portions between the apron reinforcements and the suspension housings are provided, there is a possibility that the disposition spaces of the front fenders and the swing spaces of the suspension arms are reduced. Therefore, it is difficult to provide reinforcing parts for reinforcing the joint portions between the apron reinforcements and the suspension housings, in the joint portions.

SUMMARY

The present disclosure thus provides the front body structure of a vehicle capable of improving the rigidity of the joint portions between the apron reinforcements and the suspension housings without reducing the disposition spaces of front fenders and the swing spaces of suspension arms.

According to the present disclosure, there is provided a front body structure of a vehicle, including a pair of left and right hinge pillars that extend in a vehicle up-down direction in positions separated from each other by a predetermined distance in a vehicle width direction of the vehicle; a pair of left and right front suspension dampers that are provided in desired positions on an inner side in the vehicle width direction of the hinge pillars and on a vehicle front side of the hinge pillars; a pair of left and right suspension housings having damper mount parts to which upper ends of the front suspension dampers are attached; and a pair of left and right apron reinforcements to which upper ends of the suspension housings are joined. The apron reinforcements extend toward the vehicle front side from a rear end thereof joined to upper portions of the hinge pillars, in which the apron reinforcements are formed in shapes extending substantially linearly from the rear ends thereof toward the vehicle front side and the inner side in the vehicle width direction through an outer side in the vehicle width direction of the damper mount parts in plan view.

According to the present disclosure, it is possible to improve the rigidity of the joint portions between the apron reinforcements and the suspension housings without reducing the disposition spaces of the front fenders and the swing spaces of the suspension arms.

Specifically, since the apron reinforcements are formed in shapes extending substantially linearly from the rear ends thereof to the vehicle front side and the inner side in the vehicle width direction in plan view, the front body structure of the vehicle can make the apron reinforcements closer to the front suspension dampers provided in the desired positions than in the apron reinforcements extending substantially linearly along the vehicle front-rear direction from the rear ends thereof.

In other words, the front body structure of the vehicle can make the distance in the vehicle width direction between the damper mount parts of the suspension housings and the apron reinforcements smaller than in the apron reinforcements extending substantially linearly along the vehicle front-rear direction from the rear ends thereof.

Therefore, the front body structure of the vehicle can achieve the size and weight reduction and the high rigidity of the suspension housings. In addition, the front body structure of the vehicle can suppress bending moments acting on the joint portions between the suspension housings and the apron reinforcements without separately providing reinforcing parts when input loads from the front suspension dampers act on the suspension housings.

Accordingly, the front body structure of the vehicle can improve the rigidity of the joint portions between the apron reinforcements and the suspension housings without reducing the disposition spaces of the front fenders and the swing spaces of the suspension arms.

In an aspect of the present disclosure, edges of the apron reinforcements on the inner side in the vehicle width direction may be formed in shapes raised toward the inner side in the vehicle width direction so that tops thereof are positioned in substantially the same position in the vehicle front-rear direction as the damper mount parts of the suspension housings in plan view.

According to the present disclosure, the front body structure of the vehicle can further reduce the distance in the vehicle width direction between the damper support parts of the suspension housings and the apron reinforcements. Therefore, the front body structure of the vehicle can further suppress the bending moments acting on the joint portions between the suspension housings and the apron reinforcements when the input loads from the front suspension dampers act on the suspension housings.

Accordingly, the front body structure of the vehicle can further improve the rigidity of the joint portions between the apron reinforcements and the suspension housings by forming the edges of the apron reinforcements on the inner side in the vehicle width direction in shapes raised toward the inner side in the vehicle width direction.

In addition, in an aspect of the present disclosure, the suspension housings may have suspension tower parts in which the damper mount parts are provided and outer side extending parts that extend from upper ends of the suspension tower parts toward the outer side in the vehicle width direction and the outer side extending parts may be formed in shapes that are able to be provided as parts of the apron reinforcements. The shapes that are able to be provided as parts of the apron reinforcements described above represent the shapes formed as parts of the apron reinforcements or the shapes connectable to the apron reinforcements with the shapes overlapping with the apron reinforcements.

According to the present disclosure, the front body structure of the vehicle can join the suspension housings and the apron reinforcements to each other so that the outer side extending parts of the suspension housings form parts of the apron reinforcements.

Therefore, the front body structure of the vehicle can further suppress the relative displacement difference between the suspension housings and the apron reinforcements when the input loads from the front suspension dampers act on the suspension housings.

That is, the front body structure of the vehicle can displace the suspension housings and the apron reinforcements substantially integrally when the input loads from the front suspension dampers act on the suspension housings. Therefore, the front body structure of the vehicle can further improve the rigidity against the bending moments acting on the joint portions between the suspension housings and the apron reinforcements.

Accordingly, the front body structure of the vehicle can further improve the rigidity of the joint portions between the apron reinforcements and the suspension housings without reducing the disposition spaces of the front fenders and the swing spaces of the suspension arms, due to outer side extending parts that can be provided as parts of the apron reinforcements.

In addition, in an aspect of the present disclosure, the apron reinforcements may include apron reinforcement uppers provided on a vehicle upper side and apron reinforcement lowers provided on a vehicle lower side of the apron reinforcement uppers and the outer side extending parts of the suspension housings may be formed in shapes that form closed cross sections together with the apron reinforcement uppers in a vertical cross section along the vehicle width direction and have upper reinforcing ribs erected toward the vehicle upper side along the vehicle width direction in substantially the same position in the vehicle front-rear direction as the damper mount parts.

According to the present disclosure, the front body structure of the vehicle can be provided with the upper reinforcing ribs using the closed cross section spaces formed by the outer side extending parts of the suspension housings and the apron reinforcement uppers of the apron reinforcements. Therefore, the front body structure of the vehicle can reinforce the joint portions between the apron reinforcements and the suspension housings without reducing the disposition spaces of the front fenders and the swing spaces of the suspension arms.

In addition, the front body structure of the vehicle can further suppress the relative displacement difference between the suspension housings and the apron reinforcements using the upper reinforcing ribs when the input loads from the front suspension dampers act on the suspension housings. Therefore, the front body structure of the vehicle can more surely improve the rigidity against the bending moments acting on the joint portions between the suspension housings and the apron reinforcements.

Accordingly, the front body structure of the vehicle can more surely improve the rigidity of the joint portions between the apron reinforcements and the suspension housings without reducing the disposition spaces of the front fenders and the swing spaces of the suspension arms, due to the upper reinforcing ribs of the outer side extending parts.

In addition, in an aspect of the present disclosure, the outer side extending parts of the suspension housings may have arm escape parts formed by raising portions overlapping with swing paths of upper arms toward the vehicle upper side in substantially the same position in the vehicle front-rear direction as the damper mount parts.

According to the present disclosure, the front body structure of the vehicle can surely ensure the swing spaces of the upper arms using the closed cross section spaces formed by the outer side extending parts of the suspension housings and the apron reinforcement uppers of the apron reinforcements.

In addition, since the arm escape parts are formed in the closed cross section spaces formed by the outer side extending parts and the apron reinforcement uppers, the front body structure of the vehicle can cause the arm escape parts to function as the reinforcing parts that reinforce the joint portions between the apron reinforcements and the suspension housings without reducing, for example, the disposition spaces of the front fenders.

Therefore, the front body structure of the vehicle can more surely improve the rigidity against the bending moments acting on the joint portions between the suspension housings and the apron reinforcements.

Accordingly, the front body structure of the vehicle can more surely improve the rigidity of the joint portions between the apron reinforcements and the suspension housings without reducing the disposition spaces of the front fenders and the swing spaces of the suspension arms, due to the arm escape parts provided in the outer side extending parts.

According to the present disclosure, it is possible to provide the front body structure of the vehicle capable of improving the rigidity of the joint portions between the apron reinforcements and the suspension housings without reducing the disposition spaces of the front fenders and the swing spaces of the suspension arms.

DETAILED DESCRIPTION

An embodiment of the present disclosure will be described below with reference to the drawings.

Figure 1:
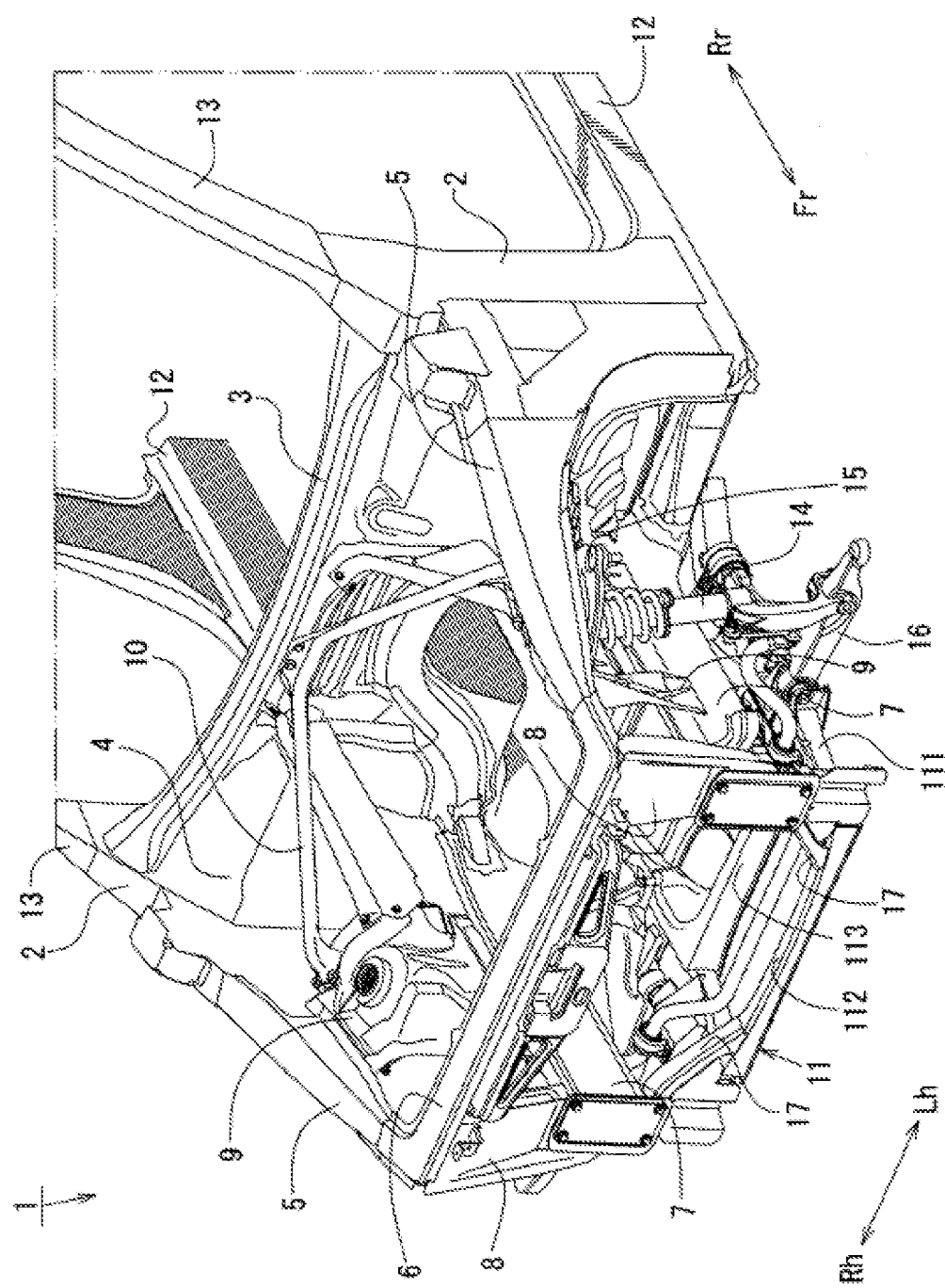
FIG. 1 is an appearance perspective view illustrating an external appearance of a front body seen from the upper front of a vehicle.
Figure 2:
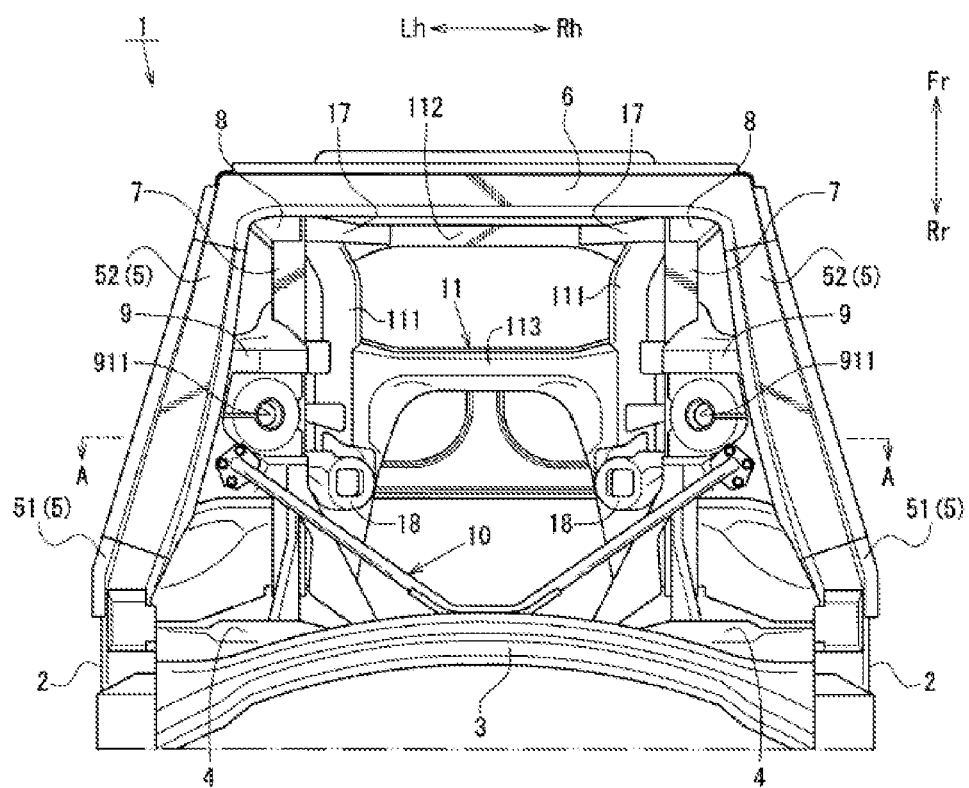
FIG. 2 is a plan view illustrating the external appearance of the front body seen from directly above.
Figure 3:
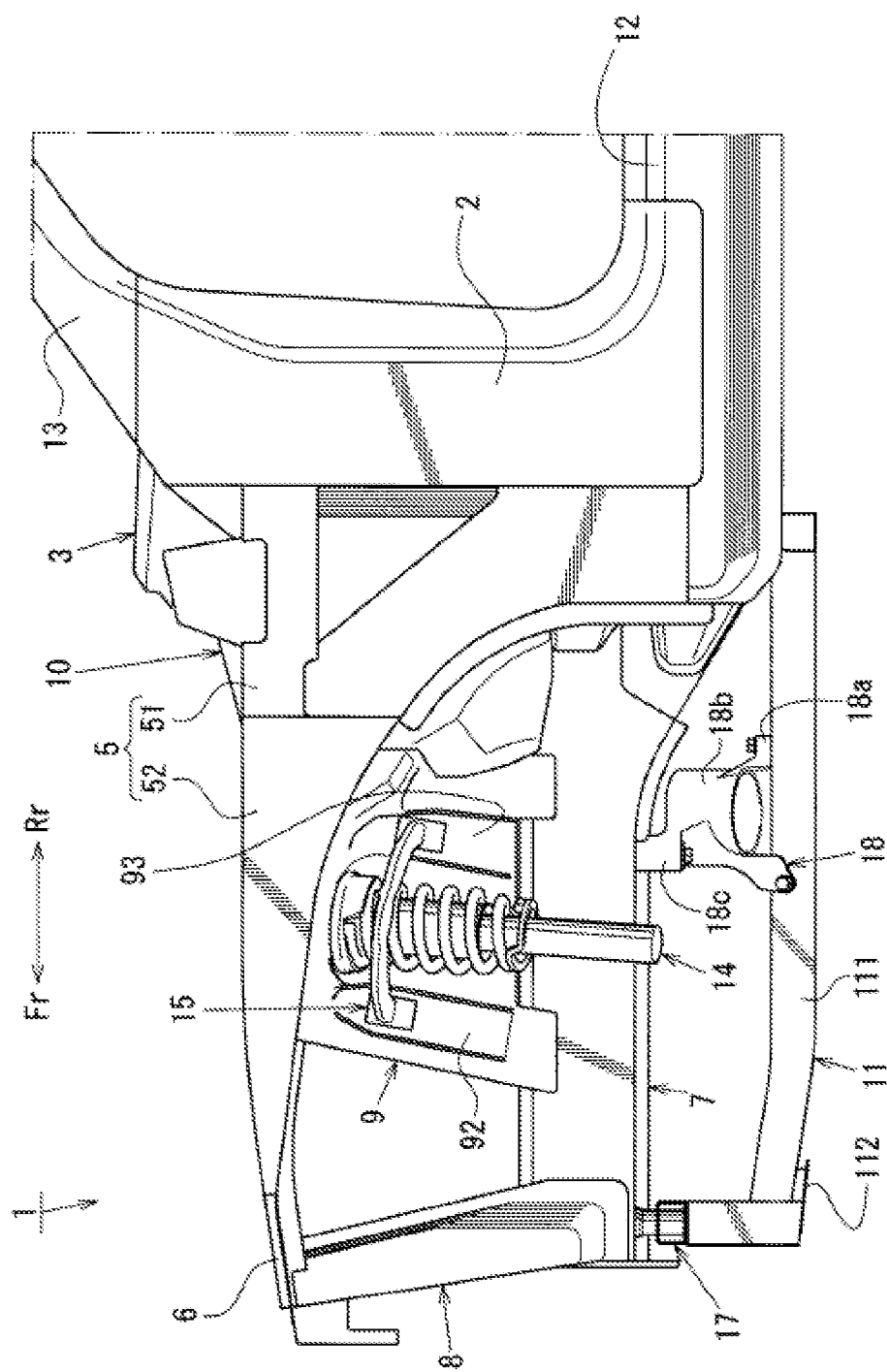
FIG. 3 is a left side view illustrating the external appearance of the front body seen from the left side.
Figure 4:
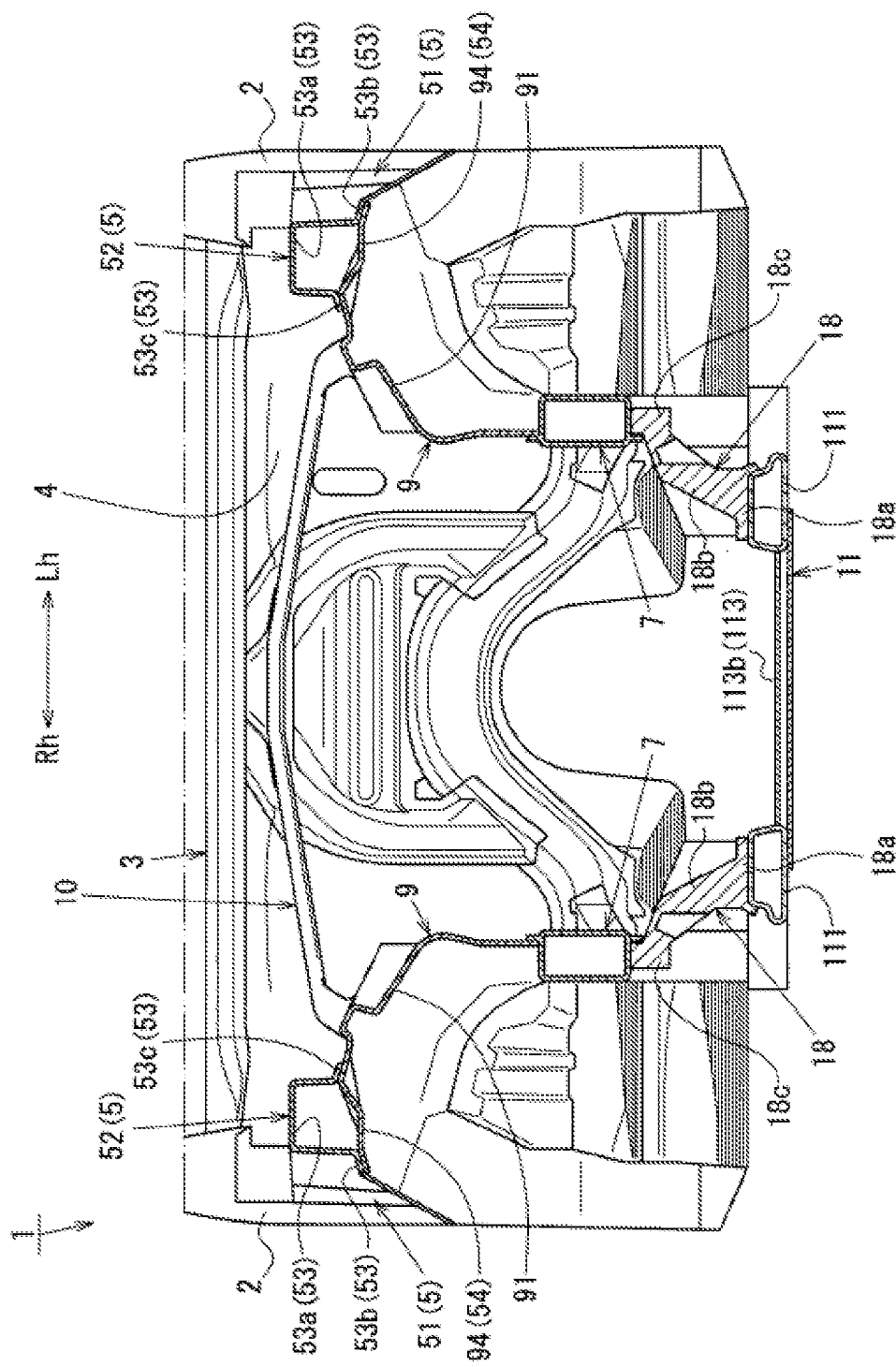
FIG. 4 is a cross sectional view seen along arrows A-A in FIG. 2.
Figure 5:
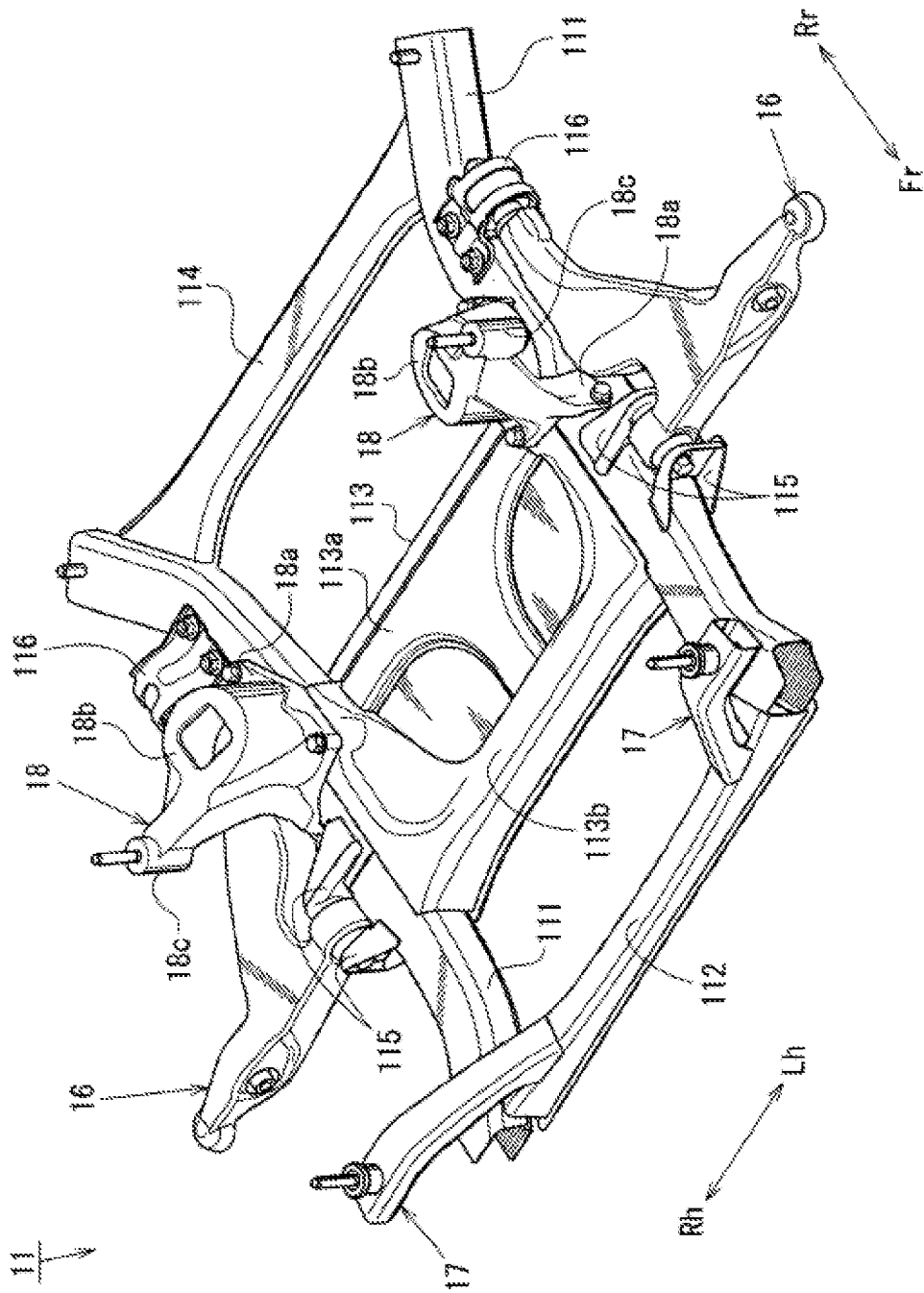
FIG. 5 is an appearance perspective view illustrating an external appearance of a sub-frame seen from the upper front of the vehicle.
Figure 6:
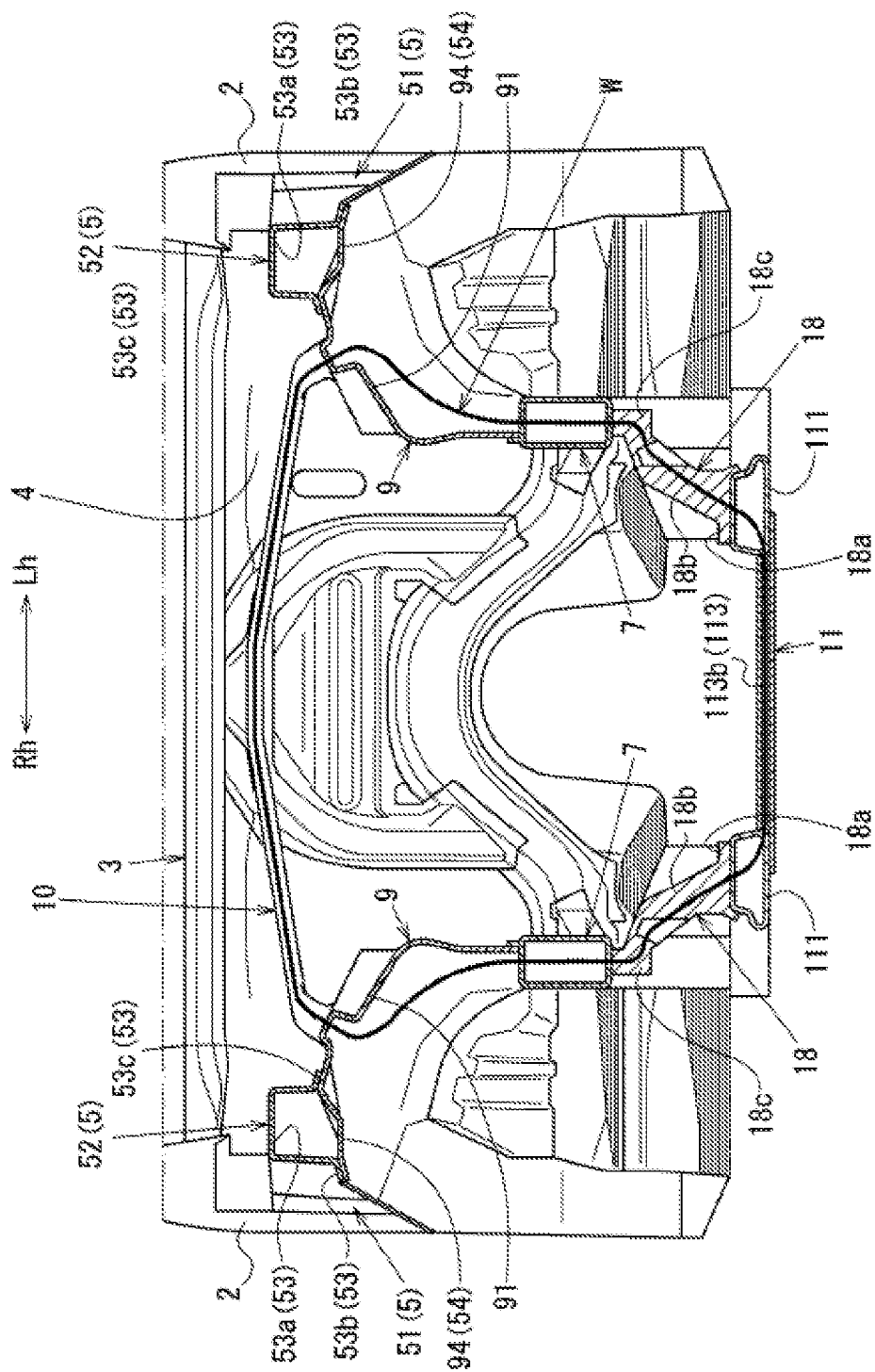
FIG. 6 is an explanatory diagram used to describe a ring-shaped structural frame.

It should be noted here that FIG. 1 is an appearance perspective view illustrating a front body seen from the upper front of a vehicle, FIG. 2 is a plan view illustrating the front body, FIG. 3 is a left side view illustrating the front body, FIG. 4 is a cross sectional view seen along arrows A-A in FIG. 2, FIG. 5 is an appearance perspective view illustrating a sub-frame 11 seen from the upper front of the vehicle, and FIG. 6 is an explanatory diagram used to describe a ring-shaped structural frame W.

Figure 7:
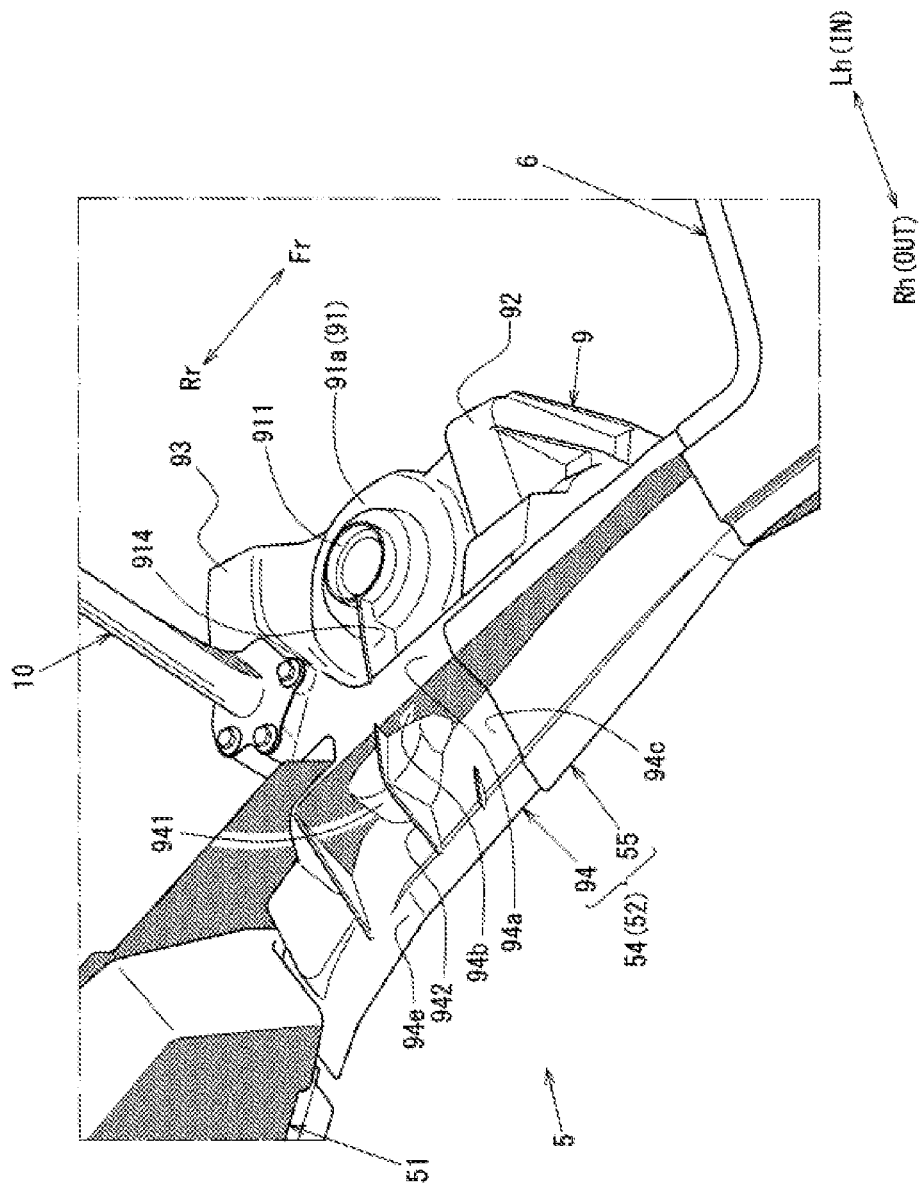
FIG. 7 is an appearance perspective view illustrating an external appearance of an apron reinforcement lower seen from the upper front of the vehicle.
Figure 8:
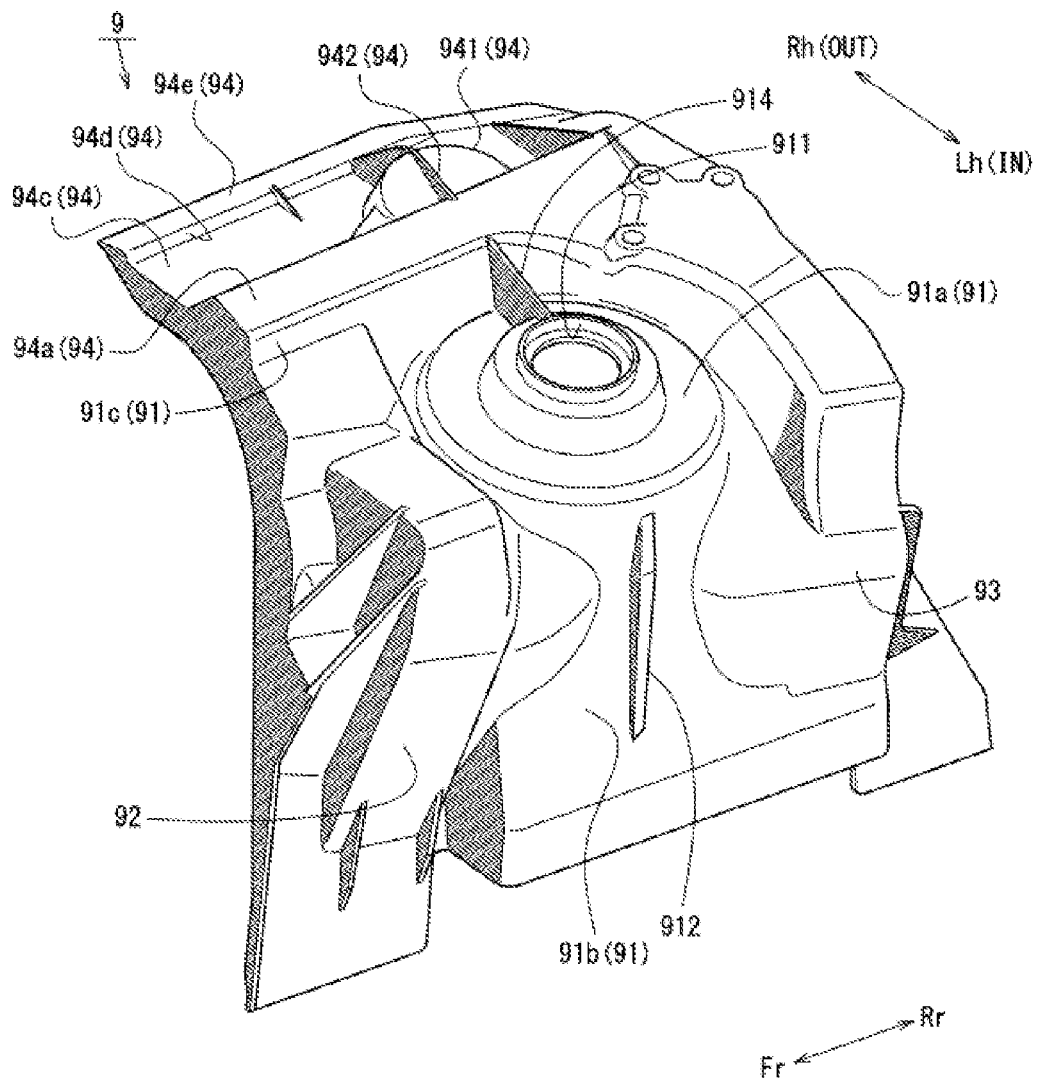
FIG. 8 is an appearance perspective view illustrating an external appearance of a suspension housing on the right side of the vehicle.
Figure 9:
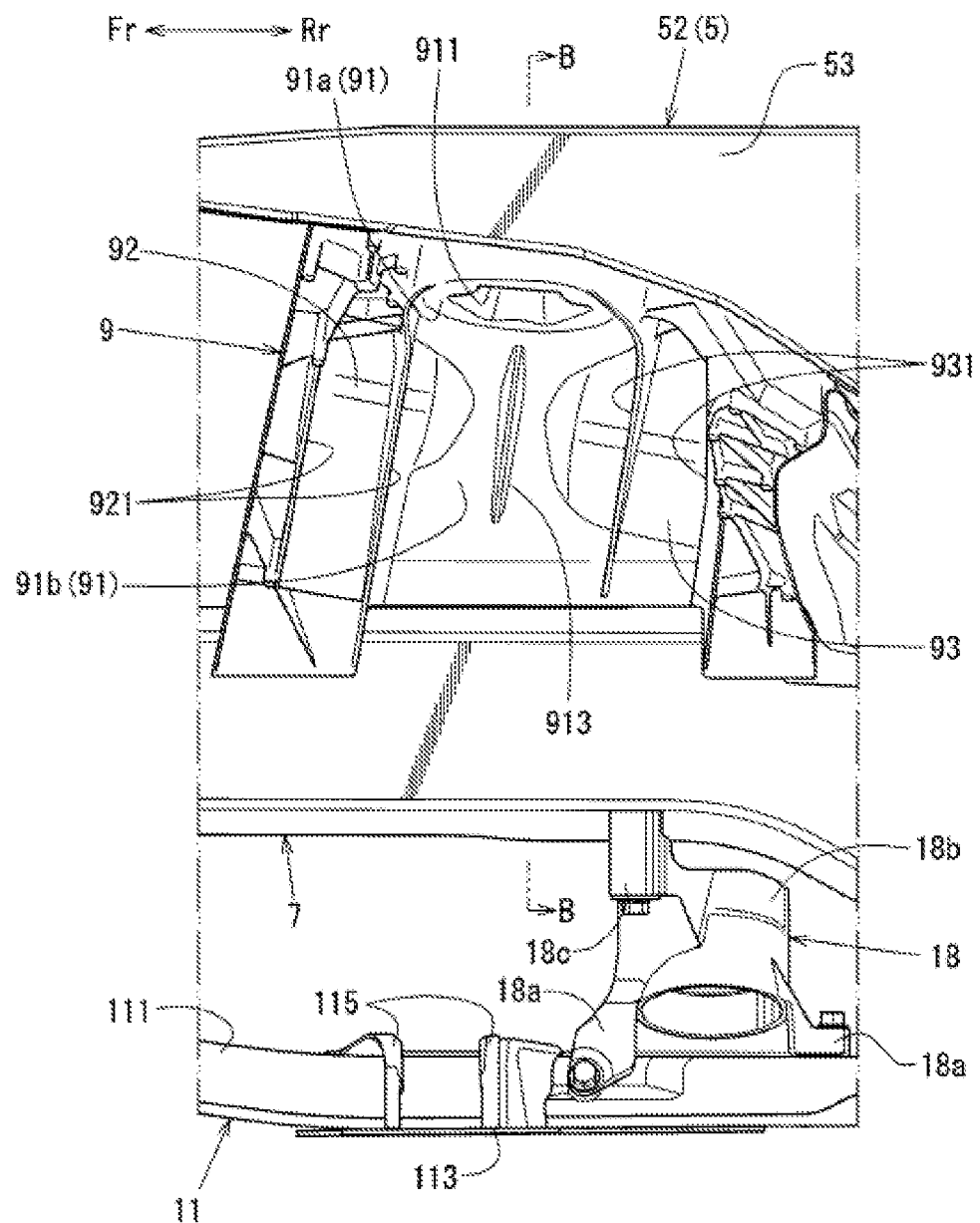
FIG. 9 is a left side view illustrating the vicinity of the suspension housing seen from the left side.
Figure 10:
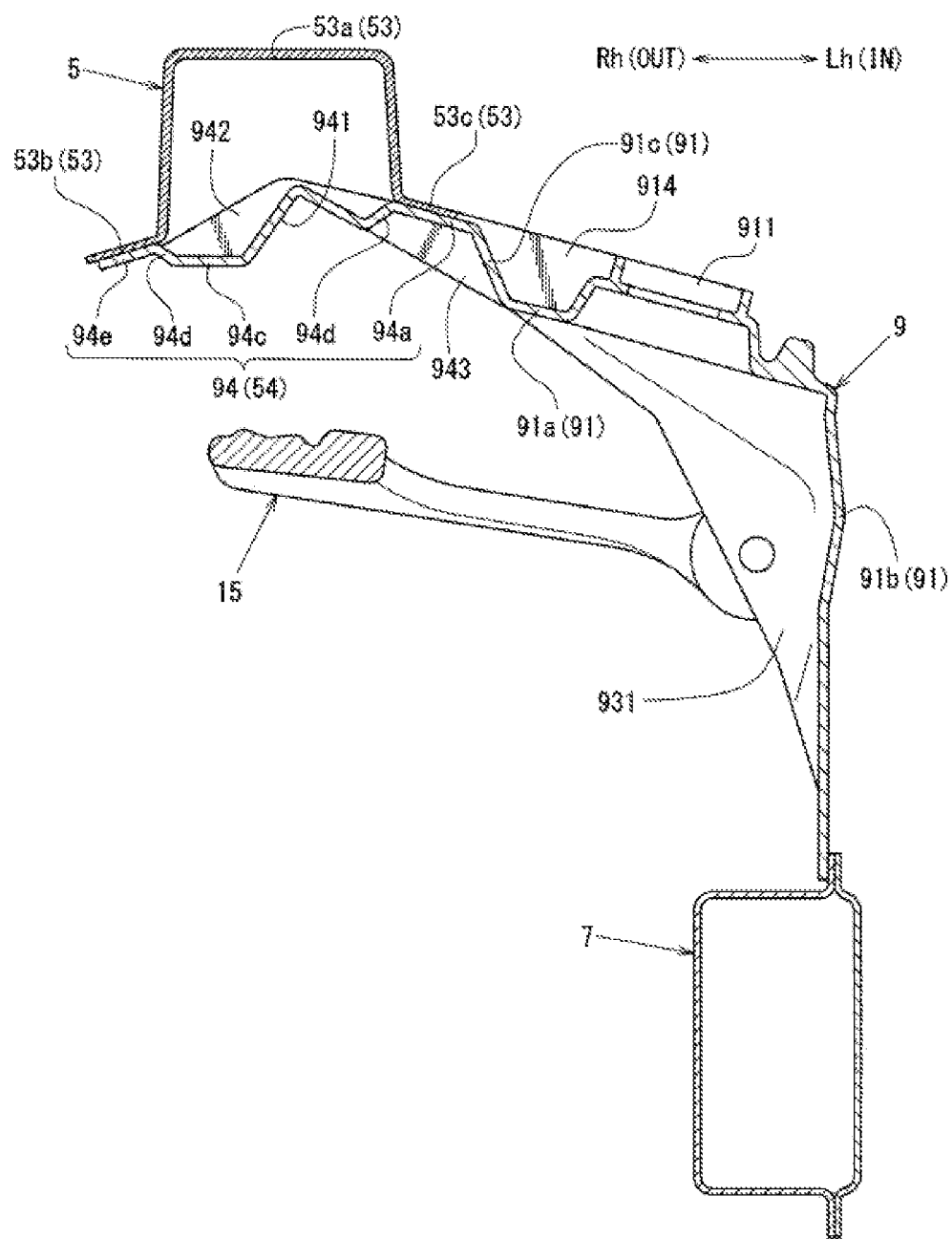
FIG. 10 is a cross sectional view seen along arrows B-B in FIG. 9.
Figure 11:
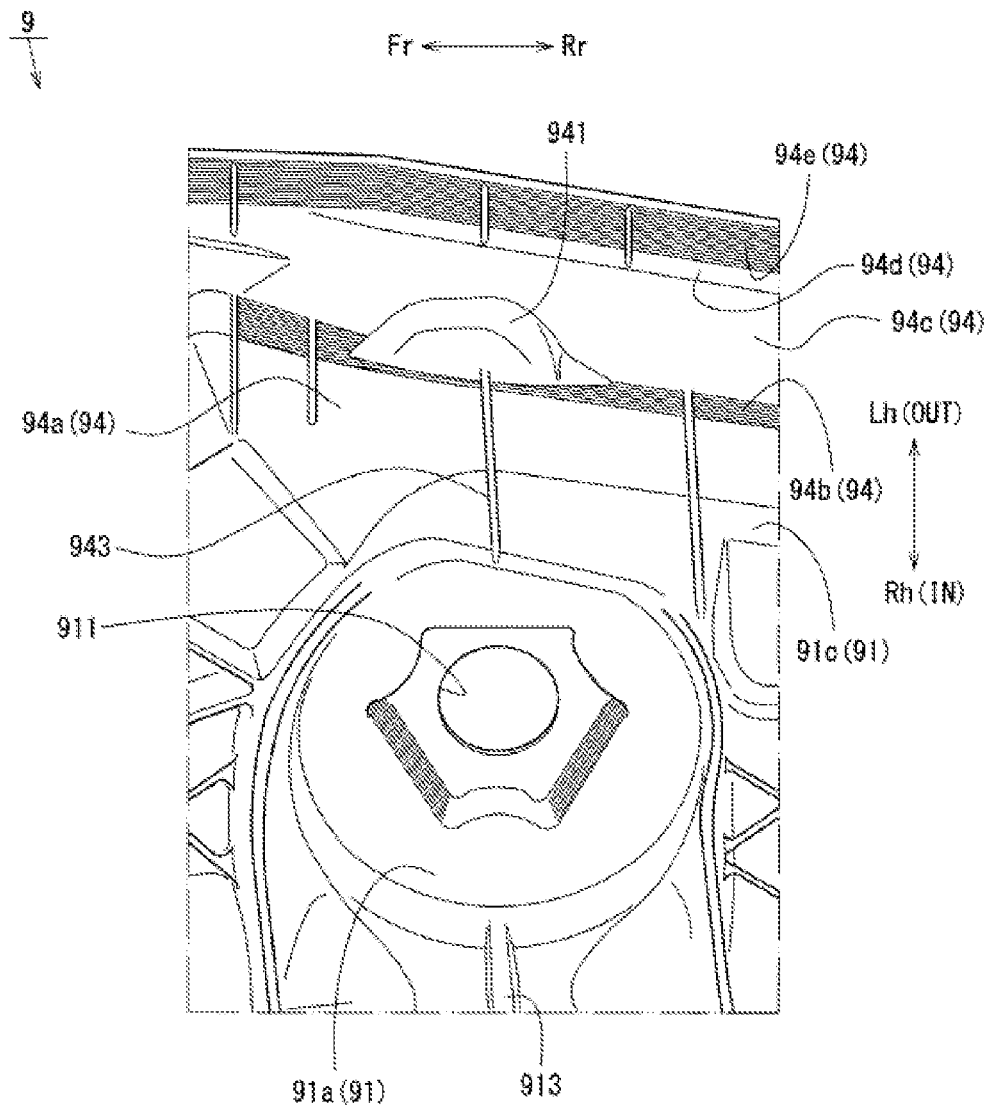
FIG. 11 is a bottom view illustrating the lower surface of an apron reinforcement structural part.

In addition, FIG. 7 is an appearance perspective view illustrating an apron reinforcement lower 54 seen from the upper front of the vehicle, FIG. 8 is an appearance perspective view illustrating a suspension housing 9 on the right side of the vehicle, FIG. 9 is a left side view illustrating the vicinity of the suspension housing 9 seen from the left side, FIG. 10 is a cross sectional view seen along arrows B-B in FIG. 9, and FIG. 11 is a bottom view illustrating an apron reinforcement structural part 94.

In addition, to clarify illustration, a lower arm 16 is not illustrated in FIG. 3 and an upper arm 15 is not illustrated in FIG. 9. In addition, in these figures, arrows Fr and Rr indicate the front-rear direction, arrow Fr indicates the front side, and arrow Rr indicates the rear side. Furthermore, arrows Rh and Lh indicate the width direction, arrow Rh indicates the right direction, and arrow Lh indicates the left direction. In addition, arrow IN indicates the inner side in the vehicle width direction and arrow OUT indicates the outer side in the vehicle width direction.

As illustrated in FIG. 1 to FIG. 3, the front body of the vehicle 1 in the embodiment includes a pair of left and right hinge pillars 2 that extend in a vehicle up-down direction in positions separated from each other by a predetermined distance in a vehicle width direction, a cowl box 3 that joins the upper portions of the hinge pillars 2 in the vehicle width direction, and a dash panel 4 provided between the hinge pillars 2.

As illustrated in FIG. 1 to FIG. 3, the front body of the vehicle 1 further includes a pair of left and right apron reinforcements 5 that extend from the upper portions of the hinge pillars 2 toward the vehicle front side, a shroud upper 6 that joins the front ends of the apron reinforcements 5 in the vehicle width direction, and a pair of left and right front side frames 7 that extend in the vehicle front-rear direction on the inner side in the vehicle width direction and on the vehicle lower side of the apron reinforcements 5.

As illustrated in FIG. 1 and FIG. 3, the front body of vehicle 1 further includes a pair of left and right shroud members 8 that join the shroud upper 6 and the front ends of the front side frames 7 to each other in a vehicle up-down direction, the pair of left and right suspension housings 9 that are provided between the hinge pillars 2 and the shroud members 8, a tower bar 10 that joins the left and right suspension housings 9 to each other, and a sub-frame 11 provided on the vehicle lower side of the front side frames 7.

The hinge pillars 2 are closed cross section members in which the cross sectional shapes in a horizontal cross section along the vehicle front-rear direction are closed cross sections and join, in the vehicle up-down direction, the front ends of side sills 12 extending in the vehicle front-rear direction in the lower portion of the vehicle interior and the front ends of front pillars 13 extending in the vehicle front-rear direction on the vehicle upper side of the side sills 12, as illustrated in FIG. 1 and FIG. 3.

In addition, as illustrated in FIG. 2, the cowl box 3 is formed in a substantially arc shape in plan view in which substantially the middle in the vehicle width direction projects toward the vehicle front side in plan view. Although not illustrated in detail, this cowl box 3 is a closed cross section member in which the cross sectional shape in a vertical cross section along the vehicle front-rear direction is a closed cross section and includes a cowl lower provided on the vehicle lower side and a cowl upper that covers the cowl lower from the vehicle upper side.

In addition, as illustrated in FIG. 1, the dash panel 4 is a panel member that forms the front wall of the vehicle interior and both ends thereof in the vehicle width direction are connected to the left and right hinge pillars 2 respectively and the upper end thereof is connected to the cowl box 3. In addition, as illustrated in FIG. 2, the apron reinforcements 5 are closed cross section members that are formed in shapes extending substantially linearly in the vehicle front-rear direction in plan view and the front ends thereof are positioned on the inner side in the vehicle width direction of the rear ends thereof.

It should be noted here that the edges of the apron reinforcements 5 on the inner side in the vehicle width direction are formed in substantially arc shapes projecting toward the inner side in the vehicle width direction so that tops thereof are positioned in substantially the same position in the vehicle front-rear direction as damper mount parts 911 described later of the suspension housings 9 in plan view, as illustrated in FIG. 2. The apron reinforcements 5 will be described later.

In addition, although not illustrated in detail, the shroud upper 6 is a closed cross section member in which the cross sectional shape in a vertical cross section along the vehicle front-rear direction is a closed cross section and includes a shroud lower panel having a substantially hat-shaped cross section projecting toward the vehicle lower side and a shroud upper panel having a substantially hat-shaped cross section projecting toward the vehicle upper side.

In addition, as illustrated in FIG. 2 and FIG. 3, the front side frames 7 are provided on the vehicle lower side and on the inner side in the vehicle width direction of the apron reinforcements 5 and the rear ends thereof are joined to the front end of a floor frame (not illustrated) that forms a closed cross section extending in the vehicle front-rear direction together with a floor panel (not illustrated) and the lower portion of the dash panel 4.

As illustrated in FIG. 4, the cross sectional shapes of the front side frames 7 in a vertical cross section along the vehicle width direction are closed cross section shapes of substantially rectangular closed cross sections and include side frame inners having substantially hat-shaped cross sections provided on the inner side in the vehicle width direction and side frame outers having substantially hat-shaped cross sections provided on the outer side in the vehicle width direction of the side frame inners.

In addition, although not illustrated in detail, the shroud members 8 are closed cross section members in which the cross sectional shapes in a horizontal cross section along the vehicle front-rear direction are substantially rectangular closed cross sections and the lower ends thereof are connected to the upper surfaces of the front side frames 7 and the side surfaces on the outer side in the vehicle width direction.

As illustrated in FIG. 1 to FIG. 3, the suspension housings 9 are high rigidity members that swingably support the upper ends of front suspension dampers 14 and the upper arms 15 provided in desired positions on the vehicle front side of the hinge pillars 2 and the dash panel 4 and provided across the apron reinforcements 5 and the front side frames 7. It should be noted here that the suspension housings 9 will be described in detail later.

In addition, as illustrated in FIG. 1 and FIG. 2, the tower bar 10 is a substantially V-shaped pipe member in plan view that is wide on the vehicle front side and both ends thereof are fastened and fixed to the upper surfaces of the rear portions of the left and right suspension housings 9 and the vicinity of substantially the middle in the vehicle width direction is joined to substantially the middle in the vehicle width direction of the cowl box 3.

In addition, as illustrated in FIG. 5, the sub-frame 11 is formed in a substantially ladder shape in plan view by a pair of left and right side members 111 that extend in the vehicle front-rear direction in positions separated from each other in the vehicle width direction and a front side suspension cross member 112, a middle suspension cross member 113, and a rear side suspension cross member 114 that join the left and right side members 111 in the vehicle width direction.

More specifically, as illustrated in FIG. 3 and FIG. 5, the left and right side members 111 are closed cross section members in which the cross sectional shapes in a vertical cross section along the vehicle width direction are substantially rectangular close cross sections and are formed in shapes having substantially the same length in the vehicle front-rear direction as the length in the vehicle front-rear direction of the front side frames 7.

In addition, as illustrated in FIG. 5, in the side members 111, front side support brackets 115 that swingably support the joint parts of the lower arms 16 on the vehicle front side are connected to the portions on the vehicle front side of rear joint members 18 described later and rear side support brackets 116 that swingably support the joint parts of the lower arms 16 on the vehicle rear side are fastened and fixed to the portions on the vehicle rear side of the rear joint members 18.

As illustrated in FIG. 2, FIG. 3, and FIG. 5, the front side suspension cross member 112 joins the left and right side members 111 to each other in the vehicle width direction in substantially the same position in the vehicle front-rear direction as the shroud members 8. Although not illustrated in detail, the front side suspension cross member 112 is a closed cross section member in which the cross sectional shape in a vertical cross section along the vehicle front-rear direction is a close cross section and includes an member upper having a substantially hat-shaped cross section projecting toward the vehicle upper side and a member lower that is substantially planar.

As illustrated in FIG. 2, FIG. 3, and FIG. 5, the middle suspension cross member 113 is formed in a shape having a rear closed cross section part 113a that is a closed cross section portion joining the left and right side members 111 to each other in substantially the same position in the vehicle front-rear direction as the rear portions (rear reinforcing parts 93 described later) of the suspension housings 9 and a front closed cross section part 113b that is a closed cross section portion joining the left and right side members 111 to each other in positions separated from the rear closed cross section part 113a toward the vehicle front side.

Specifically, as illustrated in FIG. 5, in the middle suspension cross member 113, the rear closed cross section part 113a and the front closed cross section part 113b are formed. The rear closed cross section part 113a is a closed cross section portion extending in the vehicle width direction on the vehicle rear side by connecting, in the vehicle up-down direction, a substantially H-shaped member upper in plan view that projects toward the vehicle upper side and has an opening on the outer side in the vehicle width direction and a substantially planar member lower. The front closed cross section part 113b is a closed cross section portion extending in the vehicle width direction on the vehicle front side.

As illustrated in FIG. 5, the rear side suspension cross member 114 joins the rear ends of the side members 111 in the vehicle width direction. The rear side suspension cross member 114 is a closed cross section member in which the cross sectional shape in a vertical cross section along the vehicle front-rear direction is a close cross section and includes a member upper having a substantially hat-shaped cross section projecting toward the vehicle upper side and a member lower that is substantially planar.

As illustrated in FIG. 3 and FIG. 5, in the sub-frame 11 described above, the front side suspension cross member 112 is joined to the front side frames 7 via a pair of left and right front joint members 17 and in substantially the same position in the vehicle front-rear direction as the shroud members 8 and the side members 111 are joined to the front side frames 7 via a pair of left and right rear joint members 18 in substantially the same position in the vehicle front-rear direction as the rear portions (rear reinforcing parts 93 described later) of the suspension housings 9. It should be noted here that the rear ends of the side members 111 of the sub-frame 11 are fastened and fixed to the lower surfaces of the rear ends of the front side frames 7.

As illustrated in FIG. 5, the front joint member 17 has a shape formed by extending a substantially rectangular closed cross section toward the vehicle upper side and the outer side in the vehicle width direction and then extending the substantially rectangular closed cross section toward the outer side in the vehicle width direction.

In contrast, as illustrated in FIG. 5, the rear joint members 18 are aluminum die-cast high rigidity members and integrally formed by lower side base parts 18a that are fastened and fixed to the side members 111, the substantially cylindrical housing and holding parts 18b that house and hold engine mount bushes (not illustrated) in internal spaces thereof, and upper side based parts 18c provided with fastening members to be fastened and fixed to the front side frames 7.

In addition, as illustrated in FIG. 6, the front body of the vehicle 1 with the above structure has the ring-shaped structural frame W that passes through the suspension housings 9 and is substantially ring-shaped. Specifically, as illustrated in FIG. 6, the ring-shaped structural frame W that is substantially ring-shaped in front view includes the left and right front side frames 7, the rear portions (rear reinforcing parts 93 described later) of the left and right suspension housings 9 that are high rigidity members, the tower bar 10 that is a closed cross section member, the rear closed cross section part 113a of the middle suspension cross member 113 of the sub-frame 11 that is a closed cross section member, and the left and right rear joint members 18 that are high rigidity members.

Subsequently, the apron reinforcements 5 and the suspension housings 9 described above among the components constituting the front body of the vehicle 1 in the embodiment will be described in more detail. As illustrated in FIG. 1 to FIG. 3, the apron reinforcements 5 include apron reinforcement rear parts 51 having rear ends connected to the upper portions of the hinge pillars 2 and apron reinforcement front parts 52 connected to the front ends of the apron reinforcement rear parts 51.

As illustrated in FIG. 1 to FIG. 3, the apron reinforcement rear parts 51 have closed cross sections in a vertical cross section along the vehicle width direction and have a length in the vehicle front-rear direction so that the front ends thereof are positioned in substantially the same position in the vehicle front-rear direction as the rear ends of the suspension housings 9.

As illustrated in FIG. 3, in side view, the apron reinforcement front part 52 has a substantially horizontal upper surface and a substantially arc-shaped lower surface bent like a wheel arch. As illustrated in FIG. 4, the apron reinforcement front part 52 has a substantially rectangular closed cross section in a vertical cross section along the vehicle width direction and includes an apron reinforcement upper 53 disposed on the vehicle upper side and the apron reinforcement lower 54 disposed on the vehicle lower side of the apron reinforcement upper 53.

More specifically, as illustrated in FIG. 4, in a vertical cross section along the vehicle width direction, the apron reinforcement upper 53 is formed to have a substantially hat-shaped cross section projecting toward the vehicle upper side by an open cross section part 53a having substantially gate-shaped cross section with an opening on the vehicle lower side, an outer side flange part 53b extending from the lower end of the open cross section part 53a toward the outer side in the vehicle width direction, and an inner side flange part 53c extending toward the outer side in the vehicle width direction from the lower end of the open cross section part 53a.

In contrast, as illustrated in FIG. 4, in a cross sectional shape in a vertical cross section along the vehicle width direction, the apron reinforcement lower 54 is formed in a substantially hat-shape projecting toward the vehicle lower side by a length in the vehicle up-down direction that is smaller than the length in the vehicle up-down direction of the apron reinforcement upper 53.

As illustrated in FIG. 7, the apron reinforcement lower 54 is formed by connecting, from the vehicle rear side, the apron reinforcement structural part 94 that is formed integrally with the suspension housing 9 and a lower panel 55 made of steel that joins the front end of the apron reinforcement structural part 94 and the rear end of the shroud upper 6 in this order. It should be noted here that the apron reinforcement structural part 94 will be described in detail later.

In addition, as illustrated in FIG. 1 to FIG. 3, the suspension housings 9 are, for example, aluminum die-cast high rigidity members and provided across the apron reinforcements 5 and the front side frames 7. The suspension housings 9 are provided in positions in which the hinge pillars 2, the upper ends of the front suspension dampers 14 provided in desired positions on the vehicle front side of the dash panel 4, and the upper arms 15 can be supported swingably.

More specifically, as illustrated in FIG. 3 and FIG. 8, the suspension housings 9 are integrally formed by suspension tower parts 91 to which the upper ends of the front suspension dampers 14 are attached, front reinforcing parts 92 adjacent to the vehicle front side of the suspension tower parts 91, the rear reinforcing parts 93 adjacent to the vehicle rear side of the suspension tower parts 91, and the apron reinforcement structural parts 94 formed as parts of the apron reinforcement lowers 54 of the apron reinforcements 5.

As illustrated in FIG. 3 and FIG. 8, the suspension tower part 91 is formed by a top plate portion 91a that is substantially circular in plan view and a side surface portion 91b that extends from the edge of the top plate portion 91a on the inner side in the vehicle width direction toward the vehicle lower side and forms the side surface on the inner side in the vehicle width direction. The top plate portion 91a of the suspension tower part 91 is provided with the damper mount part 911 that is substantially cylindrical in plan view and to which the upper end of the front suspension damper 14 is attached.

In addition, as illustrated in FIG. 8 and FIG. 9, on the side surface portion 91b of the suspension tower part 91, an outer side rib 912 that extends in the vehicle up-down direction and projects toward the outer side in the vehicle width direction and an inner side rib 913 that that extends in the vehicle up-down direction and projects toward the inner side in the vehicle width direction are formed in substantially the same position in the vehicle front-rear direction as the damper mount part 911.

In addition, as illustrated in FIG. 2, FIG. 7, and FIG. 8, on the top plate portion 91a of the suspension tower part 91, a first attachment part rib 914 that extends toward the outer side in the vehicle width direction in substantially the same position in vehicle front-rear direction as substantially the middle of the damper mount part 911 in plan view.

It should be noted here that, as illustrated in FIG. 7 and FIG. 8, the first attachment part rib 914 is joined to a vertical wall part 91c of the suspension tower part 91 erected toward the vehicle upper side from the edge of the top plate portion 91a on the outer side in the vehicle width direction.

As illustrated in FIG. 8, the front reinforcing part 92 is formed as a reinforcing part that reinforces the vehicle front side of the damper mount part 911. The front reinforcing part 92 has an upper surface in substantially the same position in the vehicle up-down direction as the top plate portion 91a of the suspension tower part 91 and is formed in a shape obtained by raising the range extending to the lower portion of the suspension housing 9 toward the inner side in the vehicle width direction.

In addition, as illustrated in FIG. 3 and FIG. 9, on the outer side in the vehicle width direction of the front reinforcing part 92, a front side support part 921 that swingably supports a joint part on the vehicle front side of the upper arm 15 is integrally formed. As illustrated in FIG. 9, the front side support part 921 extends in the vehicle up-down direction along both ends in the vehicle front-rear direction of the front reinforcing part 92 and is formed in a pair of walls erected toward the outer side in the vehicle width direction.

As illustrated in FIG. 8, the rear reinforcing part 93 is formed as a reinforcing part that reinforces the vehicle rear side of the damper mount part 911. The rear reinforcing part 93 has an upper surface on the vehicle upper side of the top plate portion 91a of the suspension tower part 91 and is formed in a shape obtained by raising the range extending to the lower portion of the suspension housing 9 toward the inner side in the vehicle width direction.

In addition, as illustrated in FIG. 3, FIG. 9, and FIG. 10, on the outer side in the vehicle width direction of the rear reinforcing part 93, a rear side support part 931 that swingably supports a joint part on the vehicle rear side of the upper arm 15 is integrally formed. As illustrated in FIG. 9 and FIG. 10, the rear side support part 931 extends in the vehicle up-down direction along both ends in the vehicle front-rear direction of the rear reinforcing part 93 and is formed in a pair of walls erected toward the outer side in the vehicle width direction.

As illustrated in FIG. 7, FIG. 8, and FIG. 10, the apron reinforcement structural part 94 integrally extends the vertical wall part 91c of the suspension tower part 91 and the upper ends of the front reinforcing part 92 and the rear reinforcing part 93 toward the outer side in the vehicle width direction and the cross sectional shape in a vertical cross section along the vehicle width direction is a substantially hat-shaped cross section projecting toward the vehicle lower side so as to be continuous with the lower panel 55.

Specifically, as illustrated in FIG. 7, FIG. 8, and FIG. 10, the apron reinforcement structural part 94 is integrally formed by a substantially planar inner side flange portion 94a that extends from the vertical wall part 91c of the suspension tower part 91 toward the outer side in the vehicle width direction, an inner side inclined part 94b that extends from the inner side flange portion 94a toward the outer side in the vehicle width direction and the vehicle lower side, a substantially planar bottom portion 94c that extends from the inner side inclined part 94b toward the outer side in the vehicle width direction, an outer side inclined part 94d that extends from the bottom portion 94c toward the outer side in the vehicle width direction and the vehicle upper side, and a substantially planar outer side flange portion 94e that extends from the outer side inclined part 94d toward the outer side in the vehicle width direction.

As illustrated in FIG. 10, the apron reinforcement structural part 94 forms a hollow closed cross section space by connecting the inner side flange part 53c of the apron reinforcement upper 53 to the inner side flange portion 94a and connecting the outer side flange part 53b of the apron reinforcement upper 53 to the outer side flange portion 94e.

In addition, as illustrated in FIG. 7, FIG. 8, FIG. 10, and FIG. 11, the apron reinforcement structural part 94 has an arm escape part 941 and an upper reinforcing rib 942 formed on the upper surface in the closed cross section space between the apron reinforcement structural part 94 and the apron reinforcement uppers 53 and a lower reinforcing rib 943 formed on the lower surface.

As illustrated in FIG. 7, FIG. 8, and FIG. 10, the arm escape part 941 has a substantially semicircle in plan view that has a top in substantially the same position in the vehicle front-rear direction as the damper mount part 911 in plan view and is formed in a shape obtained by raising the portion overlapping with a swing path of the end part of the upper arm 15 on the outer side in the vehicle width direction toward the vehicle upper side.

Specifically, as illustrated in FIG. 10, the arm escape part 941 is formed in a shape obtained by raising the lower portion of the inner side inclined part 94b toward the outer side in the vehicle width direction and raising the portion of the bottom portion 94c on the inner side in the vehicle width direction toward the vehicle upper side in a vertical cross section along the vehicle width direction.

As illustrated in FIG. 7, FIG. 8, and FIG. 10, the upper reinforcing rib 942 is erected toward the vehicle upper side from the arm escape part 941 and the bottom portion 94c so as to join the inner side inclined part 94b and the outer side inclined part 94d to each other in substantially the same position in the vehicle front-rear direction as the first attachment part rib 914. It should be noted here that the upper reinforcing rib 942 is formed in a shape whose top is present in substantially the same position in the vehicle up-down direction as the top of the arm escape part 941, in front view, as illustrated in FIG. 10.

As illustrated in FIG. 10 and FIG. 11, the lower reinforcing rib 943 is erected toward the vehicle lower side from the inner side flange portion 94a so as to join the vertical wall part 91c of the suspension tower part 91 and the inner side inclined part 94b of the apron reinforcement structural part 94 to each other in substantially the same position in the vehicle front-rear direction as the upper reinforcing rib 942.

That is, the first attachment part rib 914, the upper reinforcing rib 942, and the lower reinforcing rib 943 are formed so that the suspension housing 9 is substantially continuous in the range from the damper mount part 911 to the outer side inclined part 94d of the apron reinforcement structural part 94 through substantially the middle in plan view of the damper mount part 911.

As described above, in the front body structure of the vehicle 1 that includes the pair of left and right hinge pillars 2 that extend in the vehicle up-down direction in positions separated from each other by a predetermined distance in a vehicle width direction of the vehicle 1, the front suspension dampers 14 provided in desired positions on the vehicle front side on the inner side in the vehicle width direction of the hinge pillars 2, the pair of left and right suspension housings 9 that have the damper mount parts 911 to which the upper ends of the front suspension dampers 14 are attached, and the pair of left and right apron reinforcements 5 that extend toward the vehicle front side from the rear ends thereof joined to the upper portions of the hinge pillars 2 and to which the upper ends of the suspension housings 9 are joined, since the apron reinforcements 5 are formed in shapes extending substantially linearly from the rear ends thereof toward the vehicle front side and the inner side in the vehicle width direction through the outer side in the vehicle width direction of the damper mount parts 911 in plan view, the rigidity of the joint portions between the apron reinforcements 5 and the suspension housings 9 can be improved without reducing the disposition spaces of the front fenders and the swing spaces of the upper arms 15.

Specifically, since the apron reinforcements 5 are formed in shapes extending substantially linearly from the rear ends thereof to the vehicle front side and the inner side in the vehicle width direction in plan view, the front body structure of the vehicle 1 can make the apron reinforcements 5 closer to the front suspension dampers 14 provided in the desired positions than in the apron reinforcements 5 extending substantially linearly along the vehicle front-rear direction from the rear ends thereof.

In other words, the front body structure of the vehicle 1 can make the distance in the vehicle width direction between the damper mount parts 911 of the suspension housings 9 and the apron reinforcements 5 smaller than in the apron reinforcements 5 extending substantially linearly along the vehicle front-rear direction from the rear ends thereof.

Therefore, the front body structure of the vehicle 1 can achieve the size and weight reduction and the high rigidity of the suspension housings 9. In addition, the front body structure of the vehicle 1 can suppress bending moments acting on the joint portions between the suspension housings 9 and the apron reinforcements 5 without separately providing reinforcing parts when input loads from the front suspension dampers 14 act on the suspension housings 9.

Accordingly, the front body structure of the vehicle 1 can improve the rigidity of the joint portions between the apron reinforcements 5 and the suspension housings 9 without reducing the disposition spaces of the front fenders and the swing spaces of the upper arms 15.

In addition, the edges of the apron reinforcements 5 on the inner side in the vehicle width direction are formed in shapes raised toward the inner side in the vehicle width direction so that tops thereof are positioned in substantially the same position in the vehicle front-rear direction as the damper mount parts 911 of the suspension housings 9 in plan view, the front body structure of the vehicle 1 can further reduce the distance in the vehicle width direction between the damper support parts of the suspension housings 9 and the apron reinforcements 5.

Therefore, the front body structure of the vehicle 1 can further suppress the bending moments acting on the joint portions between the suspension housings 9 and the apron reinforcements 5 when the input loads from the front suspension dampers 14 act on the suspension housings 9.

Accordingly, the front body structure of the vehicle 1 can further improve the rigidity of the joint portions between the apron reinforcements 5 and the suspension housings 9 by raising the edges of the apron reinforcements 5 on the inner side in the vehicle width direction toward the inner side in the vehicle width direction.

In addition, since the suspension housings 9 have the suspension tower parts 91 provided with the damper mount parts 911 and the apron reinforcement structural parts 94 extending from the upper ends of the suspension tower parts 91 toward the outer side in the vehicle width direction and the apron reinforcement structural parts 94 are formed in shapes that can be provided as parts of the apron reinforcement 5, the front body structure of the vehicle 1 can join the suspension housings 9 and the apron reinforcements 5 to each other so that the apron reinforcement structural parts 94 of the suspension housings 9 form parts of the apron reinforcements 5.

Therefore, the front body structure of the vehicle 1 can further suppress the relative displacement difference between the suspension housings 9 and the apron reinforcements 5 when the input loads from the front suspension dampers 14 act on the suspension housings 9.

That is, the front body structure of the vehicle 1 can displace the suspension housings 9 and the apron reinforcements 5 substantially integrally when the input loads from the front suspension dampers 14 act on the suspension housings 9. Therefore, the front body structure of the vehicle 1 can further improve the rigidity against the bending moments acting on the joint portions between the suspension housings 9 and the apron reinforcements 5.

Accordingly, the front body structure of vehicle 1 can further improve the rigidity of the joint portions between the apron reinforcements 5 and the suspension housings 9 without reducing the disposition spaces of the front fenders and the swing spaces of upper arms 15, due to the apron reinforcement structural parts 94 that can be provide as parts of the apron reinforcements 5.

In addition, since the apron reinforcements 5 include the apron reinforcement uppers 53 provided on the vehicle upper side and the apron reinforcement lowers 54 provided on the vehicle lower side of the apron reinforcement uppers 53, the apron reinforcement structural parts 94 of the suspension housings 9 have shapes that form closed cross sections together with the apron reinforcement uppers 53 in a vertical cross section along the vehicle width direction and have the upper reinforcing ribs 942 erected along the vehicle width direction toward the vehicle upper side in substantially the same position in the vehicle front-rear direction as the damper mount parts 911, the front body structure of the vehicle 1 can provide the upper reinforcing ribs 942 using the closed cross section spaces formed by the apron reinforcement structural parts 94 of the suspension housings 9 and the apron reinforcement uppers 53 of the apron reinforcements 5.

Therefore, the front body structure of the vehicle 1 can reinforce the joint portions between the apron reinforcements 5 and the suspension housings 9 without reducing the disposition spaces of the front fenders and the swing spaces of the upper arms 15.

In addition, the front body structure of the vehicle 1 can further suppress the relative displacement difference between the suspension housings 9 and the apron reinforcements 5 using the upper reinforcing ribs 942 when the input loads from the front suspension dampers 14 act on the suspension housings 9. Therefore, the front body structure of the vehicle 1 can more surely improve the rigidity against the bending moments acting on the joint portions between the suspension housings 9 and the apron reinforcements 5.

Accordingly, the front body structure of the vehicle 1 can more surely improve the rigidity of the joint portions between the apron reinforcements 5 and the suspension housings 9 without reducing the disposition spaces of the front fenders and the swing spaces of the upper arms 15, due to the upper reinforcing ribs 942 of the apron reinforcement structural parts 94.

In addition, since the apron reinforcement structural parts 94 of the suspension housings 9 have the arm escape parts 941 formed by raising the portions overlapping with swing paths of the upper arms 15 toward the vehicle upper side in substantially the same position in the vehicle front-rear direction as the damper mount parts 911, the front body structure of the vehicle 1 can surely ensure the swing spaces of the upper arms 15 using the closed cross section spaces formed by the apron reinforcement structural parts 94 of the suspension housings 9 and the apron reinforcement uppers 53 of the apron reinforcements 5.

In addition, since the arm escape parts 941 are formed in the closed cross section spaces formed by the apron reinforcement structural parts 94 and the apron reinforcement uppers 53, the front body structure of the vehicle 1 can cause the arm escape parts 941 to function as the reinforcing parts that reinforce the joint portions between the apron reinforcements 5 and the suspension housings 9 without reducing, for example, the disposition spaces of the front fenders.

Therefore, the front body structure of the vehicle 1 can more surely improve the rigidity against the bending moments acting on the joint portions between the suspension housings 9 and the apron reinforcements 5.

Accordingly, the front body structure of the vehicle 1 can more surely improve the rigidity of the joint portions between the apron reinforcements 5 and the suspension housings 9 without reducing the disposition spaces of the front fenders and the swing spaces of the upper arms 15, due to the arm escape parts 941 provided in the apron reinforcement structural parts 94.

In the correspondence between the structure of the present disclosure and the above embodiment, the outer side extending parts in the present disclosure correspond to the apron reinforcement structural parts 94 of in the embodiment, but the present disclosure is not limited to only the structure of the above embodiment and other many embodiments can be obtained.

For example, although the rear joint members 18 have the housing and holding parts 18b in which the engine mount bushes are housed and held in the above embodiment, the present disclosure is not limited to this example and the rear joint members 18 may be mount-integrated joint members having attachment parts having upper surfaces to which the engine mount bushes are attached and fixed.

In addition, although the front reinforcing parts 92 and the rear reinforcing parts 93 of the suspension housings 9 are reinforcing parts having shapes raised toward the inner side in the vehicle width direction, the present disclosure is not limited to this example and the front reinforcing parts 92 and the rear reinforcing parts 93 may be reinforcing parts including a plurality of ribs that extend in the vehicle up-down direction and are erected toward the inner side in the vehicle width direction.

In addition, although the suspension housings 9 are, for example, aluminum die-cast components, the present disclosure is not limited to this example and the suspension housings 9 may be manufactured by press-forming a steel plate. In this case, the front reinforcing parts and the rear reinforcing parts of the suspension housings may be formed by open cross section members that form closed cross sections extending in the vehicle up-down direction together with the suspension towers.

In addition, although the apron reinforcement structural parts 94 of the suspension housings 9 are parts of the apron reinforcement lowers 54, the present disclosure is not limited to this example and the apron reinforcement structural parts may be formed in shapes that are connected to the upper surface of the lower panel for joining the apron reinforcement rear parts 51 and the shroud upper 6 to each other and form closed cross sections together with the apron reinforcement uppers.

What is claimed is:

1. A front body structure of a vehicle, comprising:
a pair of left and right hinge pillars that extend in a vehicle up-down direction in positions separated from each other by a predetermined distance in a vehicle width direction of the vehicle;
a pair of left and right front suspension dampers that are provided in desired positions on an inner side in the vehicle width direction of the hinge pillars and on a vehicle front side of the hinge pillars;
a pair of left and right suspension housings that have damper mount parts to which upper ends of the front suspension dampers are attached; and
a pair of left and right apron reinforcements to which upper ends of the suspension housings are joined, the apron reinforcements extending toward the vehicle front side from rear ends thereof joined to upper portions of the hinge pillars, wherein
the apron reinforcements are formed in shapes extending substantially linearly from the rear ends thereof toward the vehicle front side and the inner side in the vehicle width direction through an outer side in the vehicle width direction of the damper mount parts in plan view;
the suspension housings have suspension tower parts in which the damper mount parts are provided and outer side extending parts that extend from upper ends of the suspension tower parts toward the outer side in the vehicle width direction;
the outer side extending parts are formed in shapes that are able to be provided as parts of the apron reinforcements;
the apron reinforcements include apron reinforcement uppers provided on a vehicle upper side and apron reinforcement lowers provided on a vehicle lower side of the apron reinforcement uppers; and
the outer side extending parts of the suspension housings are formed in shapes that form closed cross sections together with the apron reinforcement uppers in a vertical cross section along the vehicle width direction and have upper reinforcing ribs erected toward the vehicle upper side along the vehicle width direction in substantially the same position in the vehicle front-rear direction as the damper mount parts.

2. The front body structure of the vehicle according to claim 1, wherein
edges of the apron reinforcements on the inner side in the vehicle width direction are formed in shapes raised toward the inner side in the vehicle width direction so that tops thereof are positioned in substantially the same position in the vehicle front-rear direction as the damper mount parts of the suspension housings in plan view.

3. The front body structure of the vehicle according to claim 1, wherein
the outer side extending parts of the suspension housings have arm escape parts formed by raising portions overlapping with swing paths of upper arms toward the vehicle upper side in substantially the same position in the vehicle front-rear direction as the damper mount parts.

4. The front body structure of the vehicle according to claim 2, wherein
the outer side extending parts of the suspension housings have arm escape parts formed by raising portions overlapping with swing paths of upper arms toward the vehicle upper side in substantially the same position in the vehicle front-rear direction as the damper mount parts.

* * * * *